Dec. 22, 1942.   L. F. RONAN   2,306,187
METAL CUTTING SAW
Filed May 1, 1940
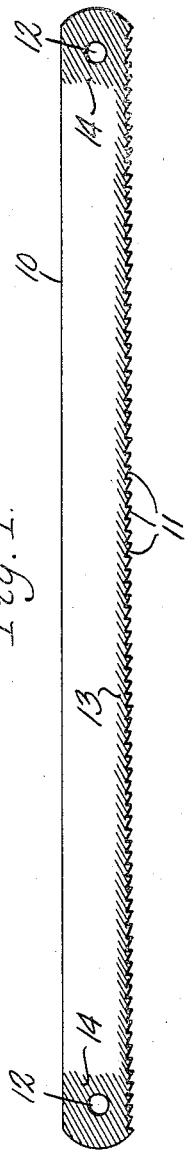
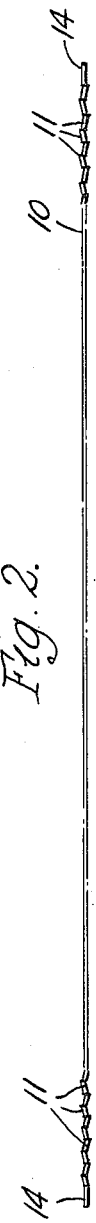
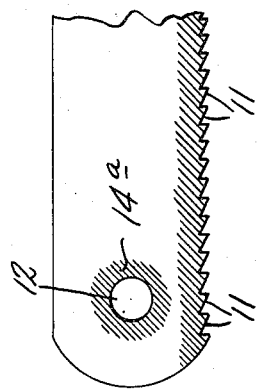
INVENTOR.
Leonard F. Ronan
By Parker, Rockwow & Farmer
ATTORNEYS.

Patented Dec. 22, 1942

2,306,187

UNITED STATES PATENT OFFICE 2,306,187

METAL CUTTING SAW

Lerned F. Ronan, East Aurora, N. Y.

Application May 1, 1940, Serial No. 332,620

4 Claims. (Cl. 29—95)

Of recent years, hack saws or metal cutting saws have been made from high speed steels which are capable of being hardened so that the saw teeth will retain their hardness and cutting sharpness for a relatively long time and enable a high speed cutting action of the saws. According to the present practice, after fabricating or machining the stock to form the blade and cut and set the teeth, etc., the blades are hardened by heat treatment to give the teeth the necessary cutting hardness. High speed steel saw blades thus made, while having teeth of the requisite hardness for high speed cutting are ordinarily so brittle and inflexible that they are frequently broken in the ordinary use thereof, which results in considerable loss from blade breakage. In order to obviate this objection and make the blades more flexible so that they are not readily broken in the ordinary use thereof, high speed steel hack saws have been made in which only the toothed edge or portion of the blade is hardened to cutting hardness, leaving the remaining portion of the blade of the original hardness or temper of the steel when machining or fabricating the saw blades. In this way, the necessary cutting hardness of the teeth was maintained, but the blade as a whole was rendered more flexible and less liable to be fractured or broken in the use thereof.

However, while blades thus made have proven to be more flexible and less brittle and, therefore, less liable to be broken in use than all-hard blades, the end portions of the blade in which the eyes or holes are made for securing the blade in the saw frame or sawing machine are left relatively soft. Experience has shown that in the use of these blades in high speed metal cutting, the attaching eyes or holes become worn or elongated in the use of the saws. As a consequence, the saws get loose or less taut in the saw frames so that they will whip and cut unevenly, and breakage of the blades results from such slackening of the blades in the saw frames. Also the eyes tear out at times, making the saws useless.

The object of my invention is to avoid such deficiencies and produce a flexible, durable high speed metal-cutting saw in which such stretching of the attaching end portions or elongation of the holes in the blade, will not occur.

This is accomplished as follows:

In order to obtain flexibility in the blade while nevertheless retaining the required cutting hardness of the teeth the blade is made as heretofore and above explained, that is, by heat-treating and tempering the toothed edge portion of the blade to obtain the required cutting hardness of the teeth, but leaving the remainder or a back portion of the body of the blade of less hardness than the toothed edge portion thereof. Furthermore, in addition to hardening the toothed edge portion of the blade, the end portions of the blade, or the portions thereof in which are located the eyes or holes for securing the blade in the saw frame, are also heat-treated to make these end or securing portions of the blade of sufficient hardness or toughness to prevent them from stretching or the holes from elongating in the use of the saw.

In the accompanying drawing:

Fig. 1 shows a face or side view; and

Fig. 2 shows an edge view of a metal cutting or hack saw embodying my invention.

Fig. 3 is a fragmentary side view showing a slight modification of the invention.

The saw blade 10, as usual, is provided with cutting teeth 11 along one edge of the blade, and is shown as provided with eyes or holes 12 in the end portions of the blade to receive the studs or pins for securing the blade in the saw frame. The shaded areas 13 and 14 in Fig. 1 are employed to represent that the toothed edge portion of the blade and the end portions of the blade, or portions in which the securing holes or eyes 12 are located, are harder than the remaining portions of the blade. The ends or portions 14 of the blade, in which the securing holes 12 are located, need not be of the same cutting hardness as the teeth or toothed edge portion of the blade, but these portions 14 are heat-treated in such a manner as to make them of a hardness or toughness such as to practically eliminate wear or elongation of the holes or stretching of the end securing portions of the blade in use throughout the cutting life of the blade. It is not essential for the entire end portions of the blade to be hardened so long as the hardened areas adequately embrace or surround the securing eyes or holes, as illustrated at 14a in Fig. 3. The blades are thus prevented from loosening or becoming slack in the saw frame and the breaking or spoiling of the blades resulting from this cause is obviated.

The blades embodying my improvements may be made from high speed steels of known types, such for example as high tungsten steel containing around 18% tungsten, 4% chromium, and 1% to 2% vanadium; or steel containing around 6% to 8% molybdenum, 4% chromium, 1% vanadium and possibly 1% to 2% tungsten. In the original state in which they are produced, the sheets of such steels from which the saw blades are made, have a Rockwell test hardness which may range from about C16 to C35. This is not a sufficient hardness for the saw teeth, or to prevent stretching or elongation of the eyes or ends of the blade under severe cutting pressure in use.

By heat treating the eyes or ends of the blade to a sufficient temperature of say, for example, 1800° F. and quenching, the ends will be hardened to approximately C42 to C45 Rockwell. Or, by heating the ends or eyes to higher temperatures, say from 2200° to 2350° F. the result will be a full hardness of approximately C60 to C65. Then, by drawing this hardness down by reheating to approximately 500° to 1150° F., depending on the length of time of soaking, a desired resulting hardness of the eyes or ends, such as C50 or C45 or C40 Rockwell can be obtained. A hardness of approximately C40 to C45 for the eyes or ends has been found satisfactory. The toothed edge portion of the blade is, of course, treated to obtain the required hardness of the teeth. This may be done according to the present known method.

It will be understood that the described improvements are applicable to both hand and machine or power-operated metal cutting or hack saws.

I claim as my invention:

1. A metal cutting saw comprising a single integral steel blade having cutting teeth along an edge thereof and means adjacent the ends of the blade for securing the saw in a saw frame, the toothed portion of the blade and also the end portions of the blade which form said securing means being of greater hardness than a body portion of the blade extending lengthwise thereof and connecting said hardened end portions back of the toothed portion of the blade.

2. A metal cutting saw comprising a steel blade having cutting teeth along an edge thereof and holes therein adjacent the ends of the blade for securing the saw in a saw frame, the toothed portion of the blade and also the end portions of the blade which contain said securing holes being of greater hardness than a portion of the blade back of the toothed edge and extending from approximately one to the other of said hardened end portions.

3. A metal cutting saw comprising a steel blade having cutting teeth along an edge thereof and holes therein adjacent the ends of the blade for securing the saw in a saw frame, the toothed portion of the blade being of a metal-cutting hardness greater than that of a longitudinal zone of the blade extending lengthwise thereof back of said toothed edge, and said end portions of the blade that contain said holes being of a hardness less than that of the toothed portion but greater than that of said longitudinal zone of the blade.

4. A metal cutting saw comprising a blade of a single integral piece of steel having cutting teeth along an edge thereof and having holes in the end portions of the blade for securing the saw in a saw frame, said end portions of the blade containing said holes being of a hardness greater than the body portion of the blade which extends between and joins said end portions, and the toothed edge portion of the blade being of a metal cutting hardness greater than that of said hardened end portions of the blade.

LERNED F. RONAN.